United States Patent [19]
Nakagawa

[11] Patent Number: 5,471,517
[45] Date of Patent: Nov. 28, 1995

[54] SUBSCRIBER SYSTEM TESTING METHOD

[75] Inventor: Shuuichi Nakagawa, Kawasaki, Japan

[73] Assignee: Fujitsu Limited, Kanagawa, Japan

[21] Appl. No.: 189,059

[22] Filed: Jan. 31, 1994

[30] Foreign Application Priority Data

Sep. 9, 1993 [JP] Japan .................. 5-224352

[51] Int. Cl.⁶ ............................. H04M 1/24
[52] U.S. Cl. ............................. 379/29
[58] Field of Search .................. 379/1, 5, 6, 9, 379/27, 29, 10, 18, 28

[56] References Cited

U.S. PATENT DOCUMENTS

| | | | |
|---|---|---|---|
| 4,270,030 | 5/1981 | Brolin et al. | 379/27 X |
| 4,424,421 | 1/1984 | Townsend et al. | 379/29 |
| 4,581,493 | 4/1986 | Gazzo et al. | 379/12 |
| 5,043,931 | 8/1991 | Kowach et al. | 364/579 |
| 5,111,497 | 5/1992 | Blivem et al. | 379/27 |

FOREIGN PATENT DOCUMENTS

| | | |
|---|---|---|
| 0202648 | 11/1986 | European Pat. Off. |
| 1264351 | 10/1989 | Japan. |
| 349343 | 3/1991 | Japan. |

Primary Examiner—Stephen Chin
Assistant Examiner—Kevin Kim

[57] ABSTRACT

In a subscriber line transmission system, subscriber circuits of a remote terminal servicing a plurality of subscribers and subscriber circuits of a central office terminal connected to a switching system are connected by multiplexed transmission lines. In this case, an arrangement is provided so that the test of the subscriber line by a subscriber line tester provided in the remote terminal and the test of the subscriber circuits by a measuring device provided in the remote terminal or central office terminal can be performed simultaneously by means of operations from a control terminal provided in the central office terminal.

11 Claims, 7 Drawing Sheets

SUBSCRIBER SYSTEM TESTING METHOD

BACKGROUND OF THE INVENTION

1. Field of the Invention

The present invention relates to a test method of a subscriber line transmission system, and particularly relates to a testing method so adapted as to be capable of testing a subscriber line and a subscriber circuit simultaneously.

A subscriber line transmission system is one which concentrates a plurality of subscriber terminals and connects them to an analog exchange through a PCM line. When a subscriber terminal exists at a place remote from any exchange, the subscriber line transmission system is used for connecting such subscribers with an analog exchange.

Development of communication networks in recent years has enhanced functions of subscriber line transmission systems. Keeping step with this, a need is increasing for various tests for maintenance of a subscriber line transmission system. However, a test for each circuit takes much time in a subscriber line test. Therefore, a method in which a test can be efficiently achieved in a short time is required.

2. Description of the Related Art

When an exchange office with a switching system has a plurality of subscribers, who are at places remote from the exchange office, a remote terminal (RT) is provided at the subscriber side, and a central office terminal (COT) is provided in the exchange. The terminals are connected through an optical transmission line comprising a PCM circuit.

Then, in the RT, the subscriber lines corresponding to the subscribers are concentrated, and a signal of each subscriber is multiplexed and converted into a PCM signal. At the same time, in the COT, the subscriber lines from the switching system corresponding to the subscribers are concentrated, and a signal of each subscriber line is multiplexed and converted into a PCM signal.

With the above arrangement, it becomes possible to reduce the cost of providing a line between the switching system and each subscriber, and at the same time to prevent a loss of a signal in a transmission line even when the distance between a subscriber and the exchange office is large.

Conventionally, using a subscriber line tester (SLT), a subscriber line transmission system is adapted to permit testing and measurement of voltage (AC and DC), insulating resistance and capacitance values of subscriber lines in a state where the subscriber lines are separated from the subscriber line circuits. In this test method, for each subscriber line, the voltage, resistance and capacitance of the subscriber line are measured, and therefore, a significantly long testing time is needed for each line Also, an arrangement is provided so that the test of the subscriber line circuits can be achieved for one subscriber at a time, by using a measuring device. In a subscriber line transmission system, the testing of the subscriber line and the test of the subscriber line circuits are conventionally done individually, so a long time is needed for testing.

Thus, there is a problem that it takes a long time for the subscriber line test and the subscriber circuit test and a test cannot be done efficiently in a conventional subscriber line transmission system.

SUMMARY OF THE INVENTION

The present invention is intended to overcome the prior art problem as mentioned above, and the object thereof is to reduce test time and promote the efficiency of tests by permitting the subscriber line test by SLT and the subscriber circuit test using a measuring device to be done simultaneously.

(1) In a subscriber line transmission system for connecting the subscriber circuits of the remote terminal servicing a plurality of subscribers and the subscriber circuits of the central office terminal connected to the switching system through a multiplexed transmission line, it is made possible to simultaneously perform the test of subscriber lines by the subscriber line tester provided in a remote terminal and the test of subscriber line circuits of a remote terminal and a central office terminal by the testing device provided in either one thereof, by means of the operations from a control terminal provided in a central office terminal.

In this case, since an arrangement is provided so that the test of subscriber lines by a subscriber line tester provided in remote terminal and the test of subscriber circuits by a measuring device provided in the remote terminal or central office terminal can be done simultaneously by means of operation from a control terminal provided in the central office terminal, according to the invention, it is possible to test the subscriber line and the subscriber line circuits in the remote terminal or contral office terminal simulaneously.

(2) In a subscriber line transmission system wherein a remote terminal servicing a plurality of subscribers is provided with a plurality of audio code converter circuit units and performs conversions bidirectionally between a signal of each subscriber line and a digital signal, a central office terminal is provided with a plurality of audio code converter circuit units and performs conversions bidirectionally between a signal of a subscriber line corresponding to each subscriber line of the subscriber side from a switching system and a digital signal, and all terminals perform multiplexing and transmission between each other via transmission lines, by providing the remote terminal with a subscriber line tester for testing subscriber lines and providing a central office terminal with a measuring system for testing audio code converter circuit units, it is made possible to test the subscriber lines on the basis of control from the control terminal and simultaneously to test the audio code converter circuit units in a fold-back state on the central office terminal side, which are separated from the subscriber line of the subscriber side on the basis of control from the control terminal.

(3) As explained above, by folding back a signal from a decoder section which converts a digital signal to an analog signal to a coder section which converts an analog signal to a digital signal in an audio code converter circuit unit, it is made possible for the test of the audio code converter circuit unit to be achieved by means of a digital signal from the measuring device.

A subscriber line transmission system is one which interconnects a central office terminal and a remote terminal via transmission lines of multiplexed circuits by providing the central office terminal with a plurality of audio code converter circuit units to convert a signal of each subscriber line from the switching system into a digital signal for multiplexing and by providing the remote terminal with a plurality of audio code converter circuit units to convert a signal of each subscriber line into a digital signal for multiplexing.

In this case, it is possible to simultaneously test the subscriber lines and the audio code converter circuit units constituting the subscriber circuits of the central office terminal side by providing the remote terminal with a subscriber line tester to test subscriber lines on the basis of control from a control terminal of the central office terminal and at the same time by providing the central office terminal with a measuring device to test audio code converter circuit units of the central office terminal side in a fold-back condition on the basis of control from the control terminal.

In this case, the test of audio code converter circuit units by the measuring device can be done with digital signals by folding back from the decoder section to the coder section in audio code converter circuit units.

(4) In a subscriber line transmission system wherein a remote terminal servicing a plurality of subscribers is provided with a plurality of audio code converter circuit units and performs conversions bidirectionally between a signal of each subscriber line and a digital signal, a central office terminal is provided with a plurality of audio code converter circuit units and performs conversions bidirectionally between a signal of a subscriber line corresponding to each subscriber line of the subscriber side from a switching system and a digital signal, and all terminals perform multiplexing and transmission between each other via transmission lines, by providing the remote terminal with a subscriber line tester for testing subscriber lines and providing a central office terminal with a measuring system for testing audio code converter circuit units, it is made possible to test the subscriber lines on the basis of control from the control terminal and simultaneously to test the audio code converter circuit units in a fold-back state on the remote terminal side, which are separated from the subscriber line of the subscriber side on the basis of control from the control terminal.

(5) In paragraph (4), by folding back a signal from a decoder section which converts a digital signal to an analog signal to a coder section which converts an analog signal to a digital signal in a audio code converter circuit unit, it is made possible for the test of the audio code converter circuit unit to be achieved by means of a digital signal from the measuring device.

The test of subscriber line and the test of audio code converter circuit units constituting subscriber circuits of the remote terminal side can be done simultaneously, by providing the remote terminal with a subscriber line tester to test subscriber lines on the basis of control from the control terminal of the central office terminal side and at the same time by providing the central office terminal with a measuring device to test audio code converter circuit units of the remote terminal side in a fold-back condition on the basis of control from the control terminal.

In this case, the test of audio code converter circuit units by the measuring device can be done with a digital signal by folding back from the decoder section to the coder section in audio code converter circuit units.

(6) In a subscriber line transmission system wherein a remote terminal servicing a plurality of subscribers is provided with a plurality of audio code converter circuit units and performs conversions bidirectionally between a signal of each subscriber line and a digital signal, a central office terminal is provided with a plurality of audio code converter circuit units and performs conversions bidirectionally between a signal of a subscriber line corresponding to each subscriber line of the subscriber side from a switching system and a digital signal, and all terminals perform multiplexing and transmission between each other via transmission lines, by providing the remote terminal with a subscriber line tester for testing subscriber lines and providing a central office terminal with a measuring system for testing audio code converter circuit units, it is made possible to test the subscriber lines on the basis of control from the control terminal and simultaneously to test the audio code converter circuit units separated from the subscriber line on the switching system side in the central office terminal on the basis of control from the control terminal.

(7) In paragraph (6), the test of the audio code converter circuit units is made possible by converting an analog signal from the measuring device into a digital signal in the coder section to return it to the measuring device and converting a digital signal from the measuring device into an analog signal in the decoder section to return it to the measuring device.

(8) In paragraph (6), the test of the audio code converter circuit units by means of an analog signal from the measuring device is made possible by converting an analog signal from the measuring device into a digital signal in the coder section and returning it to the measuring device and by converting the digital signal folded back in the measuring device into an analog signal in the decoder section and returning it to the measuring device.

(9) In paragraph (6), the test of the audio code converter circuit units by means of a digital signal from the measuring device is made possible by converting a digital signal from the measuring device into an analog signal in the decoder section and returning it to the measuring device and by converting the analog signal folded back in the measuring device into a digital signal in the coder section and returning it to the measuring device.

By providing the remote terminal side with a subscriber line tester to test subscriber lines on the basis of control from the control terminal of the central office terminal side and by providing the central office terminal with a measuring device to test audio code converter circuit units of the central office terminal side on the basis of control from the control terminal, it is possible to simultaneously test subscriber lines and audio code converter circuit units constituting subscriber circuits of the central office terminal side.

In this case, a test can be done by connecting the input and the output of the coder section in a audio code converter circuit unit to the measuring device and supplying an analog signal to the input, and another test can be done by connecting the input and the output of the decoder section to the measuring device and supplying a digital signal.

In this case, by folding back from the output of the coder section to the input of the decoder section in the measuring device, the test of audio code converter circuit units by the measuring device can be done with an analog signal.

Also in this case, by folding back from the output of the decoder section to the input of the coder section in the measuring device, the test of audio code converter circuit units by the measuring device can be done with a digital signal.

(10) In a subscriber line transmission system wherein a remote terminal servicing a plurality of subscribers is provided with a plurality of audio code converter circuit units and performs conversions bidirectionally between a signal of each subscriber line and a digital signal, a central office terminal is provided with a plurality of audio code converter circuit units and performs conversions bidirectionally between a signal of a subscriber line corresponding to each subscriber line of the subscriber side from a switching system and a digital signal, and all terminals perform multiplexing and transmission between each other via transmission lines, by providing the remote terminal with a subscriber line tester for testing subscriber lines, providing a central office terminal with a first measuring system for testing audio code converter circuit units and further providing the remote terminal with a second measuring device for testing audio code converter circuit units, it is made possible to test the audio code converter circuit units of the remote terminal side, which is separated from the subscriber lines of the subscriber side, on the basis of control from the control terminal.

(11) In paragraph (10), the test of the audio code converter circuit units is made possible by converting a digital signal from the first measuring device into an analog signal in the decoder section and supplying it to the second measuring device and by converting the analog signal from the second measuring device into a digital signal in the coder section and supplying it to the first measuring device.

(12) In paragraph (1) or (11), it is made possible to test the subscriber line by a subscriber line tester and the test of audio code converter circuit units by the first and second measuring devices simultaneously on the basis of the program in the control terminal.

It is possible to test the subscriber line and the audio code converter circuit unit constituting the subscriber circuit of the remote terminal side simultaneously, by providing the remote terminal side with a subscriber line tester to test the subscriber line on the basis of control of the control terminal of the central office terminal and at the same time by providing the central office terminal with a first measuring device and providing the remote terminal with a second measuring device to test the audio code converter circuit unit of the remote terminal side on the basis of control from the control terminal.

In this case, the audio code converter circuit unit can be tested by converting the digital signal from the first measuring device into an analog signal in the decoder section (DEC) to supply it to the second measuring device and converting the analog signal from the second measuring device into a digital signal in the coder section (CODE) to supply it to the first measuring device.

In each case described above, the test of the subscriber line by the subscriber line tester and the test of the audio code converter circuit unit by either of the measuring devices can be done simultaneously by means of the program in the control terminal. Further, it may be possible to simultaneously test the subscriber line and the audio code converters at the remote and central office sides, by using the line tester and the measuring devices.

BRIEF DESCRIPTION OF THE DRAWINGS

The present invention will be more clearly understood from the description as set forth below with reference to the accompanying drawings wherein.

DESCRIPTION OF THE PREFERRED EMBODIMENTS

Before describing the preferred embodiments according to the present invention, examples of the related art are provided with reference to accompanying drawings.

Figure 1:
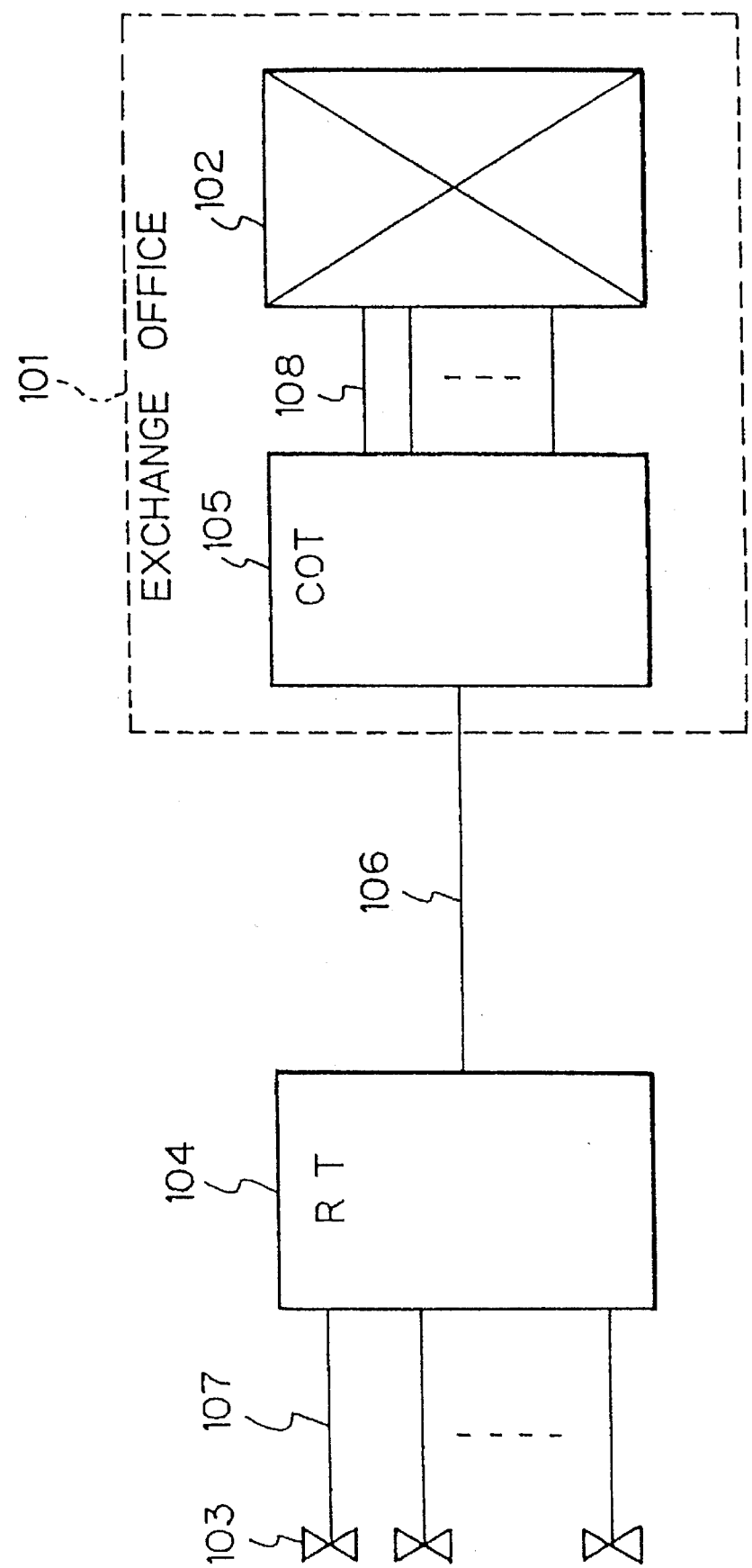
FIG. 1 is a diagram showing an overall arrangement of a conventional subscriber line transmission system to which the present inventions are applied.

FIG. 1 shows an overall arrangement of a conventional subscriber line transmission system to which the present inventions are applied. Reference numeral 101 denotes an exchange office having a switching system 102. Numeral 103 denotes a plurality of subscribers, who are at places remote from the exchange office 101. In such a case, a remote terminal (RT) 104 is provided at the subscriber side, a central office terminal (COT) 105 is provided on the exchange side, and the terminals are connected through an optical transmission line 106 comprising a PCM circuit.

Then, in RT 104, the subscriber lines 107 corresponding to the subscribers 103 are concentrated, and a signal of each subscriber is multiplexed and converted into a PCM signal. At the same time, in COT 105, the subscriber lines 108 from the switching system 102 corresponding to the subscribers 103 are concentrated, and a signal of each subscriber line is multiplexed and converted into a PCM signal.

By the above arrangement, it becomes possible to reduce the cost of providing a line between the switching system 102 and each subscriber, and at the same time to prevent a loss of a signal in a transmission line even when the distance between a subscriber 103 and the exchange office 101 is large.

Figure 2:
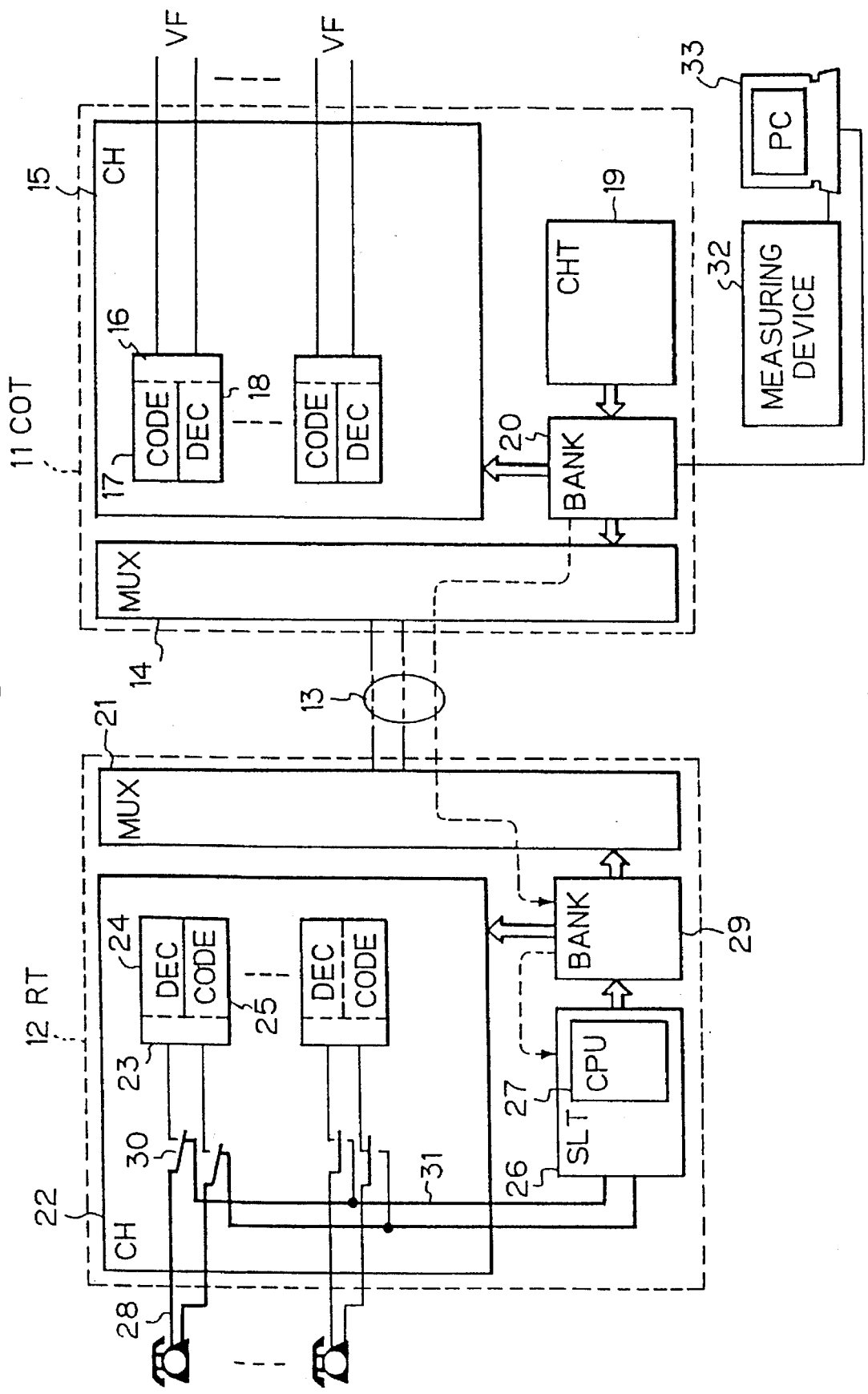
FIG. 2 is a diagram showing an arrangement and a test method of a conventional subscriber line transmission system.

In FIG. 2, which shows an arrangement and a test method of a conventional subscriber line transmission system, reference numeral 11 denotes a central office terminal (COT), numeral 12 indicates a remote terminal (RT) provided at a remote place, and COT 11 and RT 12 are connected via transmission lines 13 comprising PCM circuits.

In COT 11, reference numerals 14 and 15 denote a PCM multiplexer (MUX) for multiplexing a plurality of circuits by means of PCM system for transmission and a subscriber analog interface (CH) for servicing a plurality of subscriber circuit, respectively. Also, in CH 15, reference numeral 16 denotes audio code converter circuit units, each of which constitutes a subscriber circuit and has a coder section (CODE) 17 and a decoder section (DEC) 18.

Reference numeral 19 denotes a subscriber circuit tester (CHT), which serves as an input and output section in testing a subscriber circuit, and number 20 denotes a central controller (Bank Controller: BANK) for controlling the operation of MUX 14 and CH 15.

In RT 12, reference numeral 21 denotes a PCM multiplexer (MUX) which faces MUX 14 in COT 11, and numeral 22 denotes a subscriber analog interface (CH) for servicing a plurality of subscriber circuits. Further, in CH 22, reference numeral 23 denotes audio code converter circuit units, each of which performs coding and decoding of an audio signal and has a decoder section (DEC) 24 and a coder section 25 to constitute a subscriber circuit. Each audio code converter circuit unit in RT 12 is provided in accordance with the corresponding audio code converter circuit unit of COT 11 via a PCM multiplexed circuit.

Numeral 26 denotes a subscriber line tester (SLT) for testing a subscriber line, which has a processor (CPU) 27 and tests for anomalous voltage, insulation resistance, and anomalous capacitance of subscriber lines 28 including telephone sets. Numeral 29 denotes a central controller (Bank Controller: BANK) for controlling the operation of MUX 21 and CH 22.

Numeral 30 denotes switches, each of which switches and connects a subscriber line of a telephone set and the like to a audio code converter circuit unit 23 of SLT 26. For example, in testing, it connects a subscriber line to SLT 26 through a test line 31.

Numeral 32 denotes a measuring device provided at the COT 11 side for testing subscriber circuits, and which is capable of testing any audio code converter circuit unit in COT 11 and RT 12. Numeral 33 denotes a control terminal comprising a personal computer and so forth, which is capable of issuing various test instructions in response to operation thereof. Note that in the figure the dotted lines indicate routes of control signals based on test instructions.

In testing, a control signal is sent from BANK 20 to BANK 29 in RT 12 via a PCM circuit by issuing test instructions from the control terminal 33 to COT 11, and thereby the BANK 29 causes the switch 30 to switch to the test line 31 side to connect SLT 26 with any subscriber line.

In FIG. 2, the bold lines indicate the testing state, wherein an audio code converter circuit unit 23 constituting a subscriber circuit is separated from a subscriber line and a subscriber line alone is connected to SLT 26 via switch 30 so that LT 26 can test a subscriber line 28.

As described above, conventionally, using a subscriber line tester (SLT), a subscriber line transmission system is so adapted as to permit testing and measurement of voltage (AC and DC), insulating resistance and capacitance values of subscriber lines in a state where the subscriber lines are separated from the subscriber circuits. In the test method of this case, for each subscriber line, the voltage, resistance and capacitance of the subscriber line are measured and therefore a significantly long testing time is needed for each line.

Also, an arrangement is provided so that the test of the subscriber circuits can be achieved for one subscriber at a time. As described above, in a subscriber line transmission system, the test of the subscriber line and the test of the subscriber circuits are conventionally done individually, so a long time is needed for testing.

Figure 3:
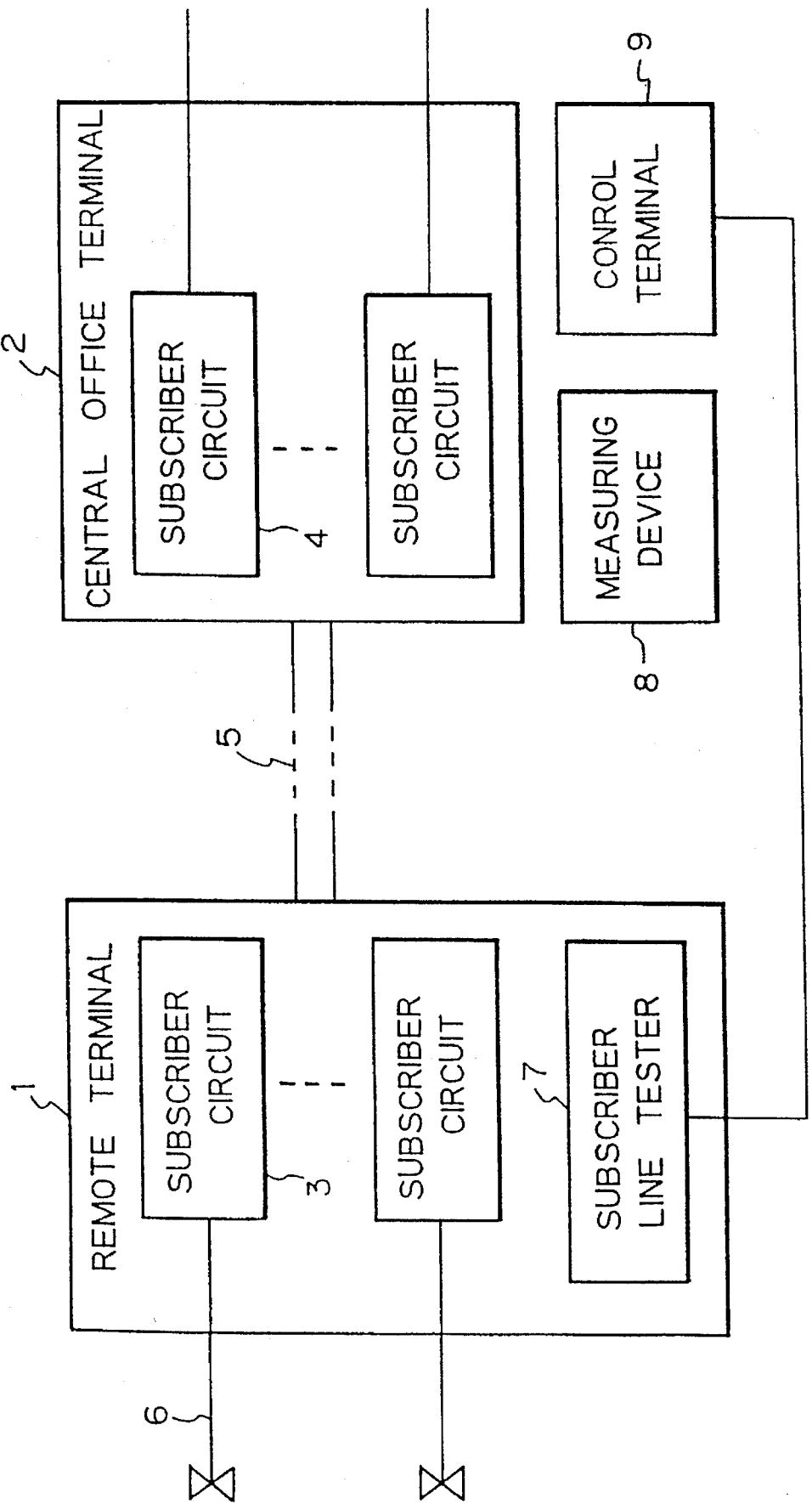
FIG. 3 is a diagram showing a fundamental architecture of the present invention.

Next, FIG. 3 shows a fundamental architecture of the present invention. A subscriber line transmission system for which the invention is intended is one which connects the subscriber circuits 3 of a remote terminal 1 servicing a plurality of subscribers and the subscriber circuits 4 of a central office terminal 2 connected to a switching system.

In this case, since an arrangement is provided so that the test of subscriber lines 6 by a subscriber line tester 7 provided in remote terminal 1 and the test of subscriber circuits by a measuring device 8 provided in the remote terminal 1 or central office terminal 2 can be done simultaneously by means of operation from a control terminal 9 provided in the central office terminal 2, according to the invention, it is possible to test the subscriber line 6 and the subscriber circuits 3 or 4 in the remote terminal 1 or central office terminal 2 simultaneously.

Figure 4:
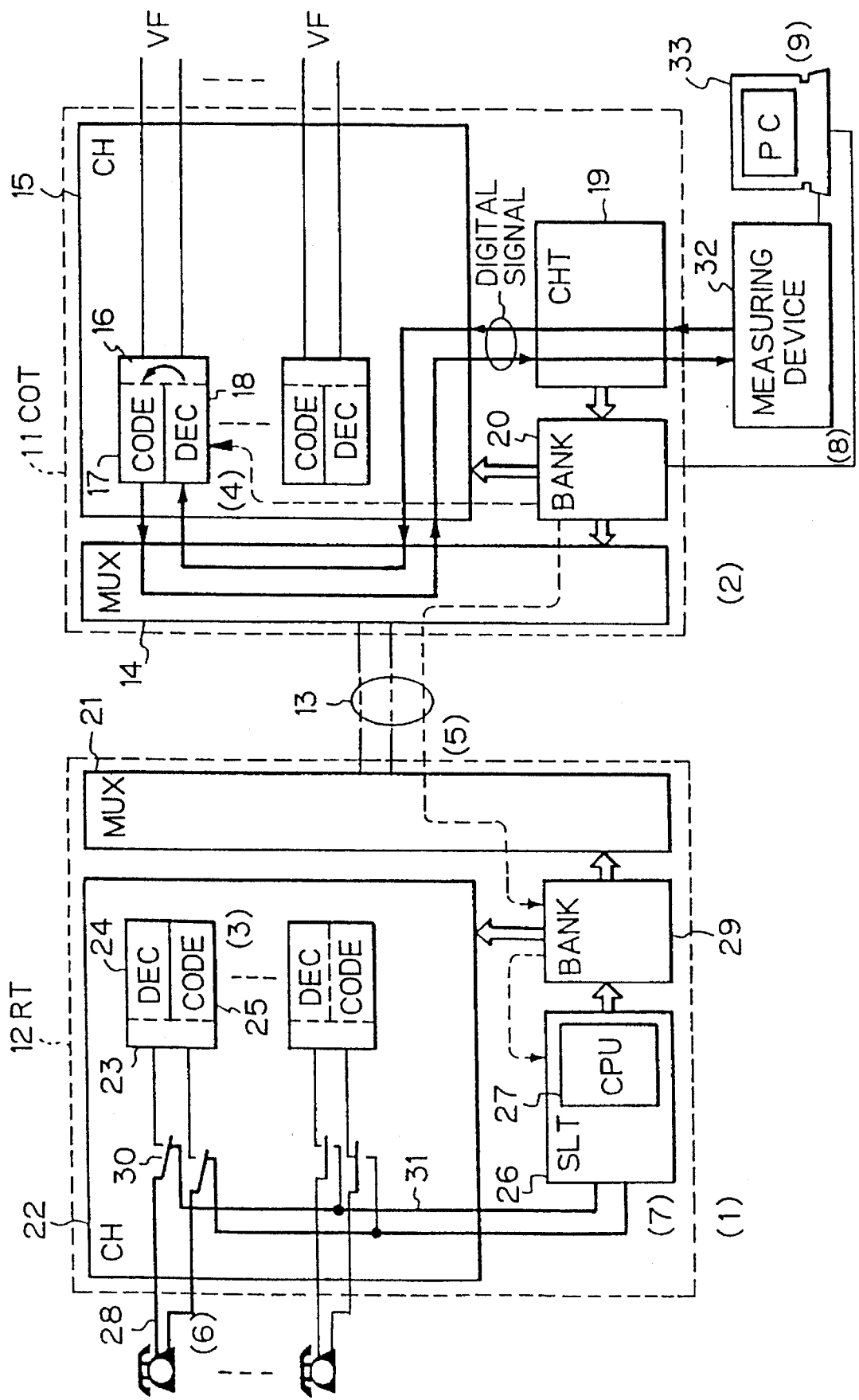
FIG. 4 is a diagram showing first embodiment of the invention.

FIG. 4 shows a first embodiment according to the present invention. This figure shows a configuration wherein the test is carried out on the COT side. In the figure, the same elements as in FIG. 2 are denoted by the same numerals.

In testing, by sending test instructions from the control terminal 33 connected to COT 11 via a transmission line 13 to SLT 26 of RT 12, any subscriber line can be connected to SLT 26 to permit the test thereof as described above. Note that in the figure, the dotted lines indicate the routes of control signals based on the test instruction.

And at the same time, by giving instructions from the control terminal 33 to BANK 20, as shown in the figure by a bold line, a signal is folded back from DEC 18 to CODE 17 in the audio code converter circuit unit 16 on the COT 11 side, which corresponds to the audio code converter circuit unit 23 that is separated from them in the RT 12 side, and at the same time the route connecting the measuring device 32 is formed from MUX 14 via CHT 19.

Under the above conditions, a digital test signal generated by the measuring device 32 is input to DEC 18 via MUX 14. The resultant analog signal decoded in DEC 18 is folded back to CODE 17 and is coded again. The resultant signal is sent to the measuring device 32 via MUX 14. Thus, a required test can be achieved by means of a digital signal in the measuring device 32.

As test items measured in the measuring device 32, there can be a test for level setting and tests of frequency characteristics, gain linearity by tone signals, quantizing noise ratio by tone signals, noise level during conversation, etc.

Thus, according to the embodiment shown in FIG. 4, the test of the subscriber line by SLT 26 and the test of the subscriber circuit (audio code converter circuit unit) on the COT side by the measuring device 32 can be done simultaneously under control of a program in a personal computer constituting the control terminal 33.

Figure 5:
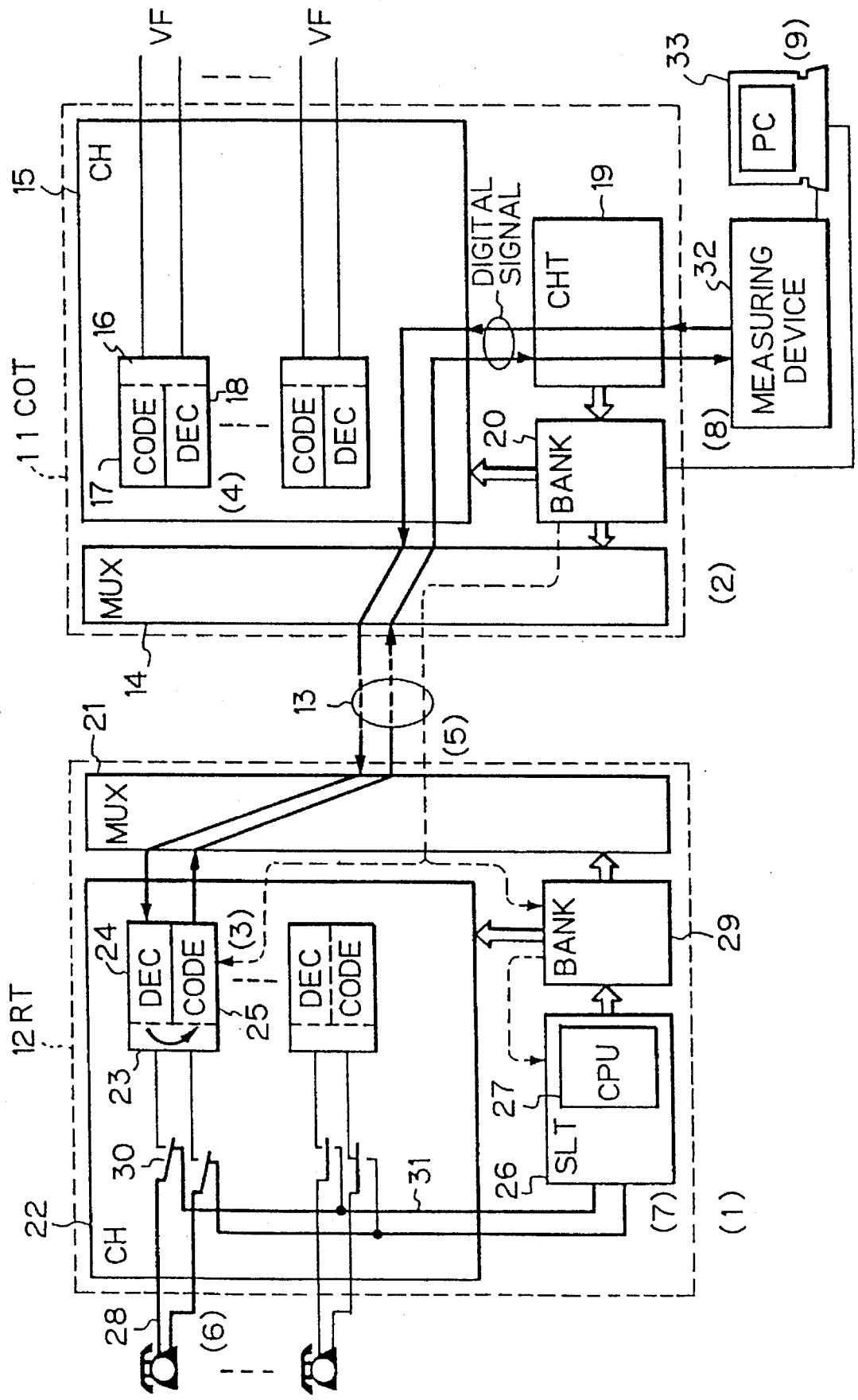
FIG. 5 is a diagram showing a second embodiment of the invention.

FIG. 5 shows a second embodiment according to the present invention. The figure shows a configuration in which testing is carried out on the RT side. In the figure, the same elements as in FIG. 2 are denoted by the same numerals.

In testing, by sending test instructions from the control terminal 33 connected to COT 11 via a transmission line 13 to SLT 26 of RT 12, any subscriber line 28 can be connected to SLT 26 to permit the test thereof as described above. Note that in the figure, the dotted lines indicate the routes of control signals based on the test instructions.

And, at the same time, by giving instructions from the control terminal 33 to BANK 20, as shown by a bold line, a signal is folded back from DEC 24 to CODE 25 in the audio code converter circuit unit which is separated from a susbcriber line in the RT 12 side, and at the same time the route connecting the measuring device 32 is formed from MUX 21 via the transmission line 13, MUX 14 and CHT 19.

Under the above conditions, a test digital signal generated by the measuring device 32 is input to DEC 24 via the transmission line 13. The resultant analog signal decoded in DEC 24 is folded back to CODE 25 and is coded again. The resultant signal is sent to the measuring device 32 via the transmission line 13. Thus, a required test can be achieved by means of a digital signal in the measuring device 32.

Figure 6:
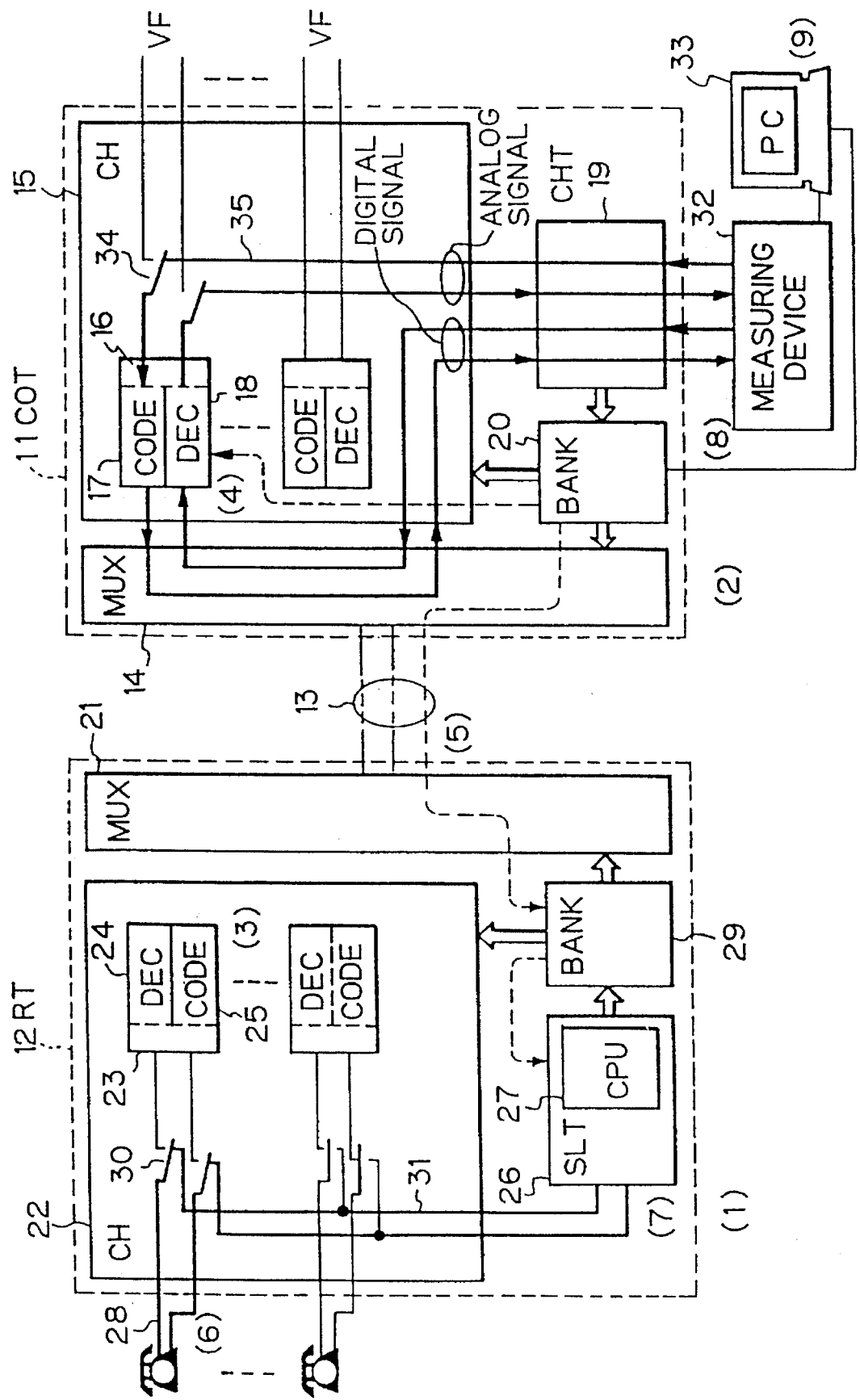
FIG. 6 is a diagram showing a third embodiment of the invention.

Thus, according to the embodiment shown in FIG. 5, the test of the subscriber line by SLT 26 and the test of the subscriber circuit (audio code converter circuit unit) of the RT side by the measuring device 32 can be done simultaneously under control of a program in a personal computer constituting the control terminal 33. FIG. 6 shows a third embodiment according to the present invention. The figure shows a configuration in which the voice frequency (VO) test is carried out on the COT side. In the figure, the same elements as in FIG. 2 are denoted by the same numerals. Reference numeral 34 denotes switches for switching and connecting the audio code converter circuit unit 16 constituting the subscriber circuit selectively to the not shown switching system side or test lines 35.

In testing, by sending test instructions from the control terminal 33 connected to COT 11 via a transmission line 13 to SLT 26 of RT 12, any subscriber line can be connected to SLT 26 to permit the test thereof as described above. Note that in the figure, the dotted lines indicate the routes of control signals based on the test instruction.

And, at the same time, by giving instructions from the control terminal 33 to BANK 20, as shown by a bold line, the switch 34 is shifted to the test line 35 side in the audio code converter circuit unit 16 that is separated from that 23 in the RT 12 side, and at the same time the signal routes are formed from the measuring device 32 through CHT 19, CODE 17 and CHT 19 back to the device 32, and from the measuring device 32 through CHT 19, DEC 18 and CHT 18 back to the device 32.

Under the above conditions, a test digital signal generated by the measuring device 32 is input to DEC 18 and the resultant analog signal decoded therein is input again to the measuring device 32. And, at the same time, a test analog signal generated by the measuring device 32 is input to CODE 17 and the resultant digital signal coded therein is input again to the measuring device 32. Thus, the foregoing tests can be achieved with respect to each of analog and digital signal inputs in the measuring device 32.

Alternatively, the folding back from the digital signal output of CODE 17 to the digital signal input of DEC 18 in the measuring device 32 enables the test of the audio code converter circuit unit 16 by an analog signal. Also, the folding back from the analog signal output of DEC 18 to the analog signal input of CODE 17 in the measuring device 32 enables the test of the audio code converter circuit unit 16 by a digital signal.

Thus, according to the embodiment shown in FIG. 6, the test of the subscriber line by SLT 26 and the test of the subscriber circuit (audio code converter circuit unit) of the COT side by the measuring device 32 can be done simultaneously under control of a program in a personal computer constituting the control terminal 33.

Figure 7:
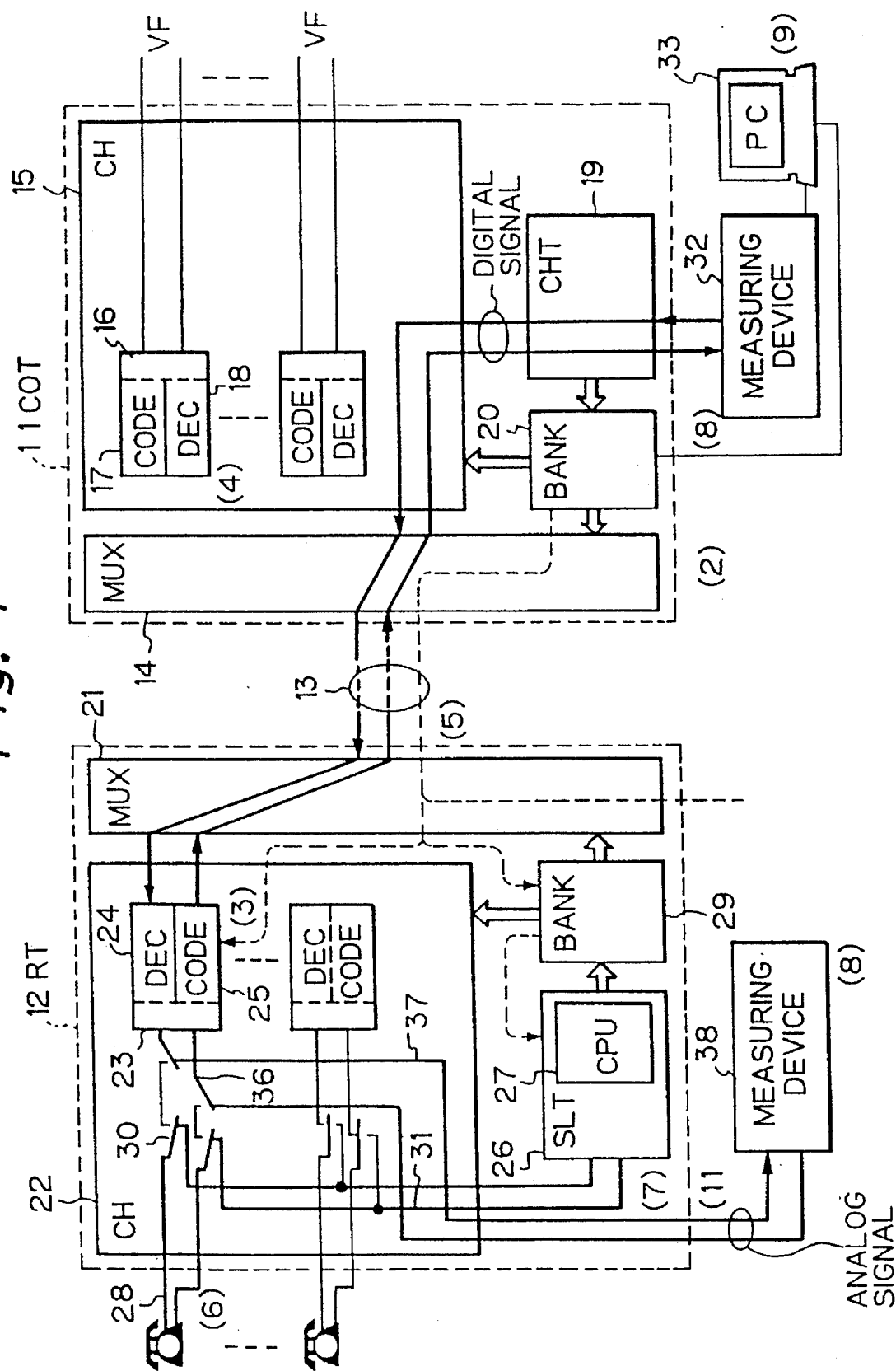
FIG. 7 is a diagram showing a fourth embodiment of the invention.

FIG. 7 shows a fourth embodiment of the present invention. The figure shows a configuration in which the voice frequency (VO) test is carried out on the RT side. In the figure, the same elements as in FIG. 2 are denoted by the same numerals. Reference numeral 36 denotes switches for switching and connecting the audio code converter circuit unit 23 constituting the subscriber circuit selectively to the subscriber line 28 or test lines 37. Reference numeral 38 denotes a measuring device provided on the RT 12 side and having the same function as the measuring device 32.

In testing, by sending test instructions from the control terminal 33 connected to COT 11 via a transmission line 13 to SLT 26 of RT 12, any subscriber line 28 can be connected to SLT 26 to permit the test thereof as described above. Note that in the figure, the dotted lines indicate the routes of control signals based on the test instructions.

And, at the same time, by giving instructions from the control terminal 33 to BANK 20, as shown by a bold line, the switch 36 is shifted to the test line 37 side so that a route is formed from the measuring device 32 through CHT 19, a transmission line 13 and DEC 24 and extending to the measuring device 38 and again therefrom through CODE 25, a transmission line 13 and CHT 19 back to the measuring device 32.

Under the above conditions, a test digital signal generated by the measuring device 32 is input to DEC 24 and the resultant analog signal decoded in DEC 24 is input to the measuring device 38, where a required test is achieved with an analog signal. At the same time, a test analog signal generated by the measuring device 38 is input to CODE 25 and the resultant digital signal coded in CODE 25 is input to the measuring device 32, where a required test is achieved with a digital signal. Thus, for the audio code converter circuit unit 23, tests by analog and digital signals can be achieved.

Thus, according to the embodiment shown in FIG. 7, the test of the subscriber line by SLT 26 and the test of the subscriber circuit (audio code converter circuit unit) on the RT side by the measuring device 32 and 38 can be done simultaneously under the control of a program in a personal computer constituting the control terminal 33.

As described above according to the present invention, in the subscriber line transmission system, it becomes possible to reduce the time which the test for the subscriber line transmission system takes and to make the test efficient, because the test of the subscriber line by the subscriber line tester and the test of the subscriber circuit, which uses the measuring device can be achieved simultaneously.

I claim:

1. A test method for a subscriber line transmission system, said transmission system, by means of multiplexed transmission lines, connecting subscriber lines and associated subscriber circuits located at a remote terminal to associated subscriber circuits located at a central office terminal, said central office terminal being connected to a switching system and including a control terminal, said remote terminal servicing a plurality of subscribers and including a subscriber line tester, said subscriber line transmission system also including a first measuring device located at one of said central office terminal and said remote terminal, for testing subscriber circuits, comprising the steps:

(a) separating a selected subscriber line from an associated subscriber circuit in said remote terminal;

(b) connecting said selected subscriber line to said subscriber line tester;

(c) connecting said first measuring device to said associated subscriber circuit corresponding to said selected subscriber line;

(d) testing said connected subscriber line with said line tester and simultaneously testing said connected associated subscriber circuit with said first measuring device, said connecting and simultaneous testing being in response to signals from said control terminal located in said central office terminal, the time required for system testing being reduced by said simultaneous testing.

2. A testing method as in claim 1, wherein each of said subscriber circuits of said remote terminal includes an associated audio code converter circuit unit to carry out mutual conversions between a signal of each subscriber line and a digital signal, and each of said subscriber circuits at said central office terminal being associated with a respective subscriber line, and including an audio code converter circuit unit to carry out mutual conversions between a signal from said switching system and a digital signal, comprising further steps performed prior to step (d):

separating the associated audio code converter circuit unit of said selected subscriber line at said remote terminal from the associated audio code converter circuit unit at said central office terminal; and in step (c) connecting said associated audio code converter circuit unit of one of said central office terminal and said remote terminal in a fold-back condition.

3. A subscriber system testing method as in claim 2, wherein said test of said audio code converter circuit unit is made with digital signals from said first measuring device by folding back, in said audio code converter circuit unit, from a decoder section for converting a digital signal into an analog signal to a coder section for converting an analog signal into a digital signal.

4. A subscriber system testing method as in claim 2, wherein said test of said audio code converter circuit unit is made with digital signals from said first measuring device by folding back, in said audio code converter circuit unit, from a decoder section for converting a digital signal into an analog signal to a coder section for converting an analog signal into a digital signal.

5. A test method for a subscriber line transmission system, said transmission system, by means of multiplexed transmission lines, connecting subscriber lines and a respective associated audio code converter circuit unit located at a remote terminal to a respective associated audio code converter circuit unit located at a central office terminal, said central office terminal being connected by subscriber lines to a switching system and including a control terminal, said remote terminal servicing a plurality of subscribers and including a subscriber line tester, said subscriber line transmission system also including a first measuring device for testing audio code converter circuit units located at said central office terminal, comprising the steps:

(a) separating a selected subscriber line from an associated audio code converter circuit unit in said remote terminal;

(b) connecting said selected subscriber line in said remote terminal to said subscriber line tester;

(c) connecting said first measuring device to a selected one of said audio code converter circuit units in said central office terminal;

(d) separating said one selected audio code converter circuit unit in said central office terminal from an associated subscriber line connected to said switching system;

(e) testing said connected subscriber line at said remote terminal with said line tester and simultaneously testing said connected audio code converter circuit unit at said central office terminal with said first measuring device, said connecting and simultaneous testing being in response to signals from said control terminal located in said central office terminal, the time required for system testing being reduced by said simultaneous testing.

6. A subscriber system testing method as defined in claim 5, wherein said test of said audio code converter circuit unit is made by converting an analog signal from said first measuring device into a digital signal in a coder section of said audio code converter circuit unit and returning said digital signal to said first measuring device, and by converting a digital signal from said first measuring device into an analog signal in a decoder section of said audio code converter circuit unit and returning said analog signal to said first measuring device.

7. A subscriber system testing method as defined in claim 5 wherein said test of said audio code converter circuit unit is made in the coder section by converting an analog signal from said first measuring device into a digital signal, and returning said digital signal to said first measuring device, and said test is made in the decoder section by converting said digital signal, which is folded back in said first measuring device into an analog signal, and returning said analog signal to said first measuring device.

8. A subscriber system testing method as in claim 5, wherein said test of said audio code converter circuit unit is made in the decoder section by converting a digital signal from said first measuring device into an analog signal, and returning said analog signal to said first measuring device, and said test is made in the coder section by converting the analog signal folded back in said first measuring device into a digital signal, and returning said digital signal to said first measuring device.

9. A test method for a subscriber line transmission system, said transmission system, by means of multiplexed transmission lines, connecting subscriber lines and a respective associated audio code converter unit located at a remote terminal to a respective associated audio code converter unit located at a central office terminal, said central office terminal being connected to a switching system and including a control terminal, said central office terminal also including a first measuring device for testing audio code converter units located at one of said central office terminal and said remote terminal, said remote terminal servicing a plurality of subscribers and including a subscriber line tester and a second measuring device, comprising the steps:

(a) separating a selected subscriber line from an associated audio code converter circuit unit in said remote terminal;

(b) connecting said selected subscriber line to said subscriber line tester;

(c) connecting one of said first and second measuring devices to one of said audio code converter circuit units at said remote terminal and;

(d) testing said connected subscriber line with said line tester and simultaneously testing said connected audio code converter circuit unit with said connected measuring device, said connecting and simultaneous testing being in response to signals from said control terminal located in said central office terminal, the time required for system testing being reduced by said simultaneous testing.

10. A subscriber system testing method as in claim 9, wherein said test of said audio code converter circuit unit is made in a decoder section of said audio code converter circuit unit, by converting a first digital signal from said first measuring device into a first analog signal and supplying said first analog signal to said second measuring device, and in a coder section of said audio code converter circuit unit by converting a second analog signal from said second measuring device into a second digital signal and supplying said second digital signal to said first measuring device.

11. A subscriber system testing method as in claim 9 wherein said test of the subscriber lines by said subscriber line tester and testing of the audio code converter circuit units by at least one of said first measuring device and said second measuring device, are made simultaneously on the basis of a program in said control terminal.

* * * * *